(12) United States Patent
Scheu et al.

(10) Patent No.: US 8,981,787 B2
(45) Date of Patent: Mar. 17, 2015

(54) DETECTION OF CHARGING CABLE

(71) Applicant: Dr. Ing. h.c.F. Porsche Aktiengesellschaft, Stuttgart (DE)

(72) Inventors: Michael Scheu, Tuebingen (DE); Daniel Spesser, Moensheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 191 days.

(21) Appl. No.: 13/709,539

(22) Filed: Dec. 10, 2012

(65) Prior Publication Data

US 2013/0154667 A1 Jun. 20, 2013

(30) Foreign Application Priority Data

Dec. 15, 2011 (DE) .......................... 10 2011 056 501

(51) Int. Cl.
| | |
|---|---|
| *G01R 31/04* | (2006.01) |
| *G01B 7/02* | (2006.01) |
| *B60L 3/00* | (2006.01) |
| *B60L 11/18* | (2006.01) |

(52) U.S. Cl.
CPC ... *G01B 7/02* (2013.01); *B60L 3/00* (2013.01); *B60L 11/1816* (2013.01); *Y02T 10/7088* (2013.01); *Y02T 10/7005* (2013.01); *Y02T 90/16* (2013.01); *B60L 11/1818* (2013.01); *B60L 2230/12* (2013.01); *Y02T 90/121* (2013.01); *Y02T 90/14* (2013.01)
USPC ........... 324/538; 324/500; 324/512; 324/617; 701/1; 320/109

(58) Field of Classification Search
CPC ........ G01B 7/02; G01R 31/021; G01R 31/11; G01R 7/026; G01R 31/083; G01R 31/085; G01R 31/086; H04B 10/0771; H04B 3/50; H04B 1/0466
USPC ................ 324/500, 512, 538; 701/1; 320/109
See application file for complete search history.

(56) References Cited

U.S. PATENT DOCUMENTS

| | | | |
|---|---|---|---|
| 5,714,876 | A | 2/1998 | Baker |
| 6,917,888 | B2 | 7/2005 | Logvinov et al. |
| 7,688,024 | B2 | 3/2010 | Kamaga |
| 2005/0057869 | A1* | 3/2005 | Hale et al. ........................ 361/64 |
| 2011/0251810 | A1 | 10/2011 | Dzung et al. |
| 2012/0029728 | A1* | 2/2012 | Hirayama et al. ................ 701/1 |
| 2012/0091958 | A1* | 4/2012 | Ichikawa et al. .............. 320/109 |

FOREIGN PATENT DOCUMENTS

| | | |
|---|---|---|
| EP | 2 194 355 | 6/2010 |
| WO | 03/094765 | 11/2003 |

OTHER PUBLICATIONS

German Search Report of Jun. 29, 2012.

* cited by examiner

*Primary Examiner* — Tung X Nguyen
*Assistant Examiner* — Son Le
(74) *Attorney, Agent, or Firm* — Gerald E. Hespos; Michael J. Porco; Matthews T. Hespos

(57) ABSTRACT

A method is provided for detecting a state of a connection between an electrically driven motor vehicle (1) and a corresponding charging station. The motor vehicle (1) has a control pilot (CP) function with a vehicle-side control pilot (CP) line (3). The method includes using a power line communication (PLC) chip (2) of the motor vehicle (1) to measure the length of a control pilot line between the motor vehicle and the charging station.

6 Claims, 2 Drawing Sheets

DETECTION OF CHARGING CABLE

CROSS REFERENCE TO RELATED APPLICATION

This application claims priority under 35 USC 119 to German Patent Appl. No. 10 2011 056 501.9 filed on Dec. 15, 2011, the entire disclosure of which is incorporated herein by reference.

BACKGROUND OF THE INVENTION

1. Field of the Invention

The invention relates to a method for detecting a state of a connection between an electrically driven motor vehicle and a corresponding charging station, a corresponding device and an electric vehicle.

2. Description of the Related Art

Hybrid vehicles are driven by at least one electric motor and one further energy converter, such as an internal combustion engine. The hybrid vehicle draws energy from a fuel tank and a storage device in the vehicle for electrical energy. The internal combustion engine can be driven in the hybrid drive mode more frequently and for longer in a favorable efficiency range. Excess energy that is produced is used via a generator for charging the battery, i.e. charging the storage device for electrical energy.

Pure electric vehicles are driven exclusively with electrical energy and have batteries that are charged by external energy sources. Such plug-in vehicles can be charged both from the domestic network, i.e. in a garage, as well as charging stations at public locations, for example in repair shops or directly at the edge of the road in the direct vicinity of parking spaces.

U.S. Pat. No. 7,688,024 B2 describes a device for monitoring the charge of a vehicle. A resistor is connected to first and second terminals that have a vehicle inlet. A control pilot line is connected to the first terminal for transmitting a pilot signal. A corresponding switch is configured if the vehicle inlet is not connected to a plug.

Information relating to car owners, power consumption and the like should be exchanged quickly and reliably between the vehicle and a charging station when the battery is charged at a charging station. Furthermore, a motor vehicle that could automatically detect the type of the charge and provide the vehicle driver with precise details about the sequencing of the charging process would be advantageous.

An object of the invention is to provide a method for automatically detecting a connection between an electric vehicle and a charging station to improve the user friendliness and to speed up the charging of a storage device for electrical energy.

SUMMARY OF THE INVENTION

The present invention relates to a method for detecting a state of a connection between an electrically driven motor vehicle and a corresponding charging station, a corresponding device and an electrically driven motor vehicle.

The method of the invention detects a state of a connection between a corresponding charging station and an electrically driven motor vehicle that has a control pilot function and an associated vehicle-side control pilot line. The method preferably uses a power line communication chip to measure a length of a control pilot line between the motor vehicle and the charging station.

A primary control line between an electric vehicle and a charging station is referred to as a control pilot (CP) line. The primary control line is connected via a control circuit of the electric vehicle to a device ground and functions to: check the presence and connection of the vehicle; permits feeding and deactivation of a power supply; transmits the rated current of the charging station to the vehicle; and monitors for the presence of a device ground.

A voltage-modulated and pulse-width-modulated signal between the charging column/charging cable of the charging station and the vehicle is used during a charging process to achieve these functions.

Data transmission via power networks is referred to as power line communication (PLC). More details on the power line communication (PLC) can be found in a book by K. Dostert "POWER LINE Communication", Franzis Verlag, 2000. The following statements regarding PLC are made therein. While in the past, only power supply companies were able to make profit-producing use of PLC, the situation changed fundamentally at the end of the 20th century as a result of deregulation of the telecommunication and energy markets. The capacity of typical access systems extends over a frequency range up to approximately 20 MHz and up to data rates of 350 Mbit/s, making available a large potential. However, the use possibilities are not unlimited because frequency bands are required whose assignment could adversely affect primary radio services as a result of an unintended radio emission. Compromises are therefore required to define useable ranges and level limiting values. In addition, as far as possible symmetrical transmission paths have to be found on which to a large extent appropriate signal propagation occurs in every cycle. While energy communication networks take into account this aspect from the start, energy distribution networks, in particular in buildings, are usually far from the symmetrical state. The careful selection of frequency ranges and modulation methods with respect to electromagnetic compatibility and the identification of possibilities for "network conditioning" are therefore particular challenges. In central Europe, the electric power supply can be divided into three levels, a high voltage level (110 kV to 380 kV), a medium voltage level (10 kV to 30 kV) and a low voltage level with 0.4 kV. The various voltage levels serve to span different distances with low losses. Between the voltage levels there are transformers which are natural barriers to PLC carrier frequencies. For alternating current the resistance of a wire grows with the frequency owing to the skin effect, to be more precise it grows with the square root of the frequency. In addition, in the case of cables electrical losses occur in the insulating materials which lead to a frequency-proportional increase in dissipation losses. Electrical parameters of the wiring is subject to wide variations, as a result of which the damping and the impedance are subject to correspondingly high tolerances. A cable which is generally used today has four-sector geometry which can be modeled with a strip line model. As a result, the variables of the impedance and damping which are important for PLC can be determined. In the case of the feeding in of a signal between two phases, an impedance of approximately 45 to 50Ω is obtained, while low frequency dependence can be observed which indicates low losses. In contrast, the damping increases as the frequency rises and reaches a value of approximately 50 dB at 20 MHz and a length of 1 km. The damping therefore generally rises with the frequency. In contrast to conventional communication channels, the disruption on power networks cannot be modeled as additive white Gaussian noise AWGN. This is due to the fact that in addition to colored background noise with relatively small spectral power density, narrowband interference also occurs as a result of radio transmitters, and in particular various types of pulse jammers. The latter have a high degree of variance over time, i.e. changes in the region of microseconds and milliseconds are to be expected. When a pulse occurs, the spectral power density rises considerably, with the result that bit errors or else burst errors are probable during a data transmission. In order to design high-speed PLC systems, knowledge of the pulse response of the channel is necessary in order to define important parameters such as the length of symbols. The pulse response of a channel is linked to the complex transmission frequency via the Fourier transform. In order to carry out necessary measurements, a return line is generally required. This has been implemented in particular in housing installation networks where the use of a main line is not so problematic.

Standard modulation methods in telecommunications have proven unsuitable for a power line communication (PLC). The use of the following methods can be successful only after suitable specific modification, but considerable differences in quality also result:
1. bandspread methods such as "direct sequence spread spectrum,(DSSS)";
2. broadband individual carrier methods;
3. broadband multi-carrier methods with adaptive decision fed-back equalization; and
4. multi-carrier methods in the form of orthogonal frequency division multiplexing (OFDM).

A data stream that is to be transmitted cannot be concentrated in a coherent spectrum only in the third and fourth method but rather, if necessary, can be distributed among subchannels with any desired intermediate intervals. In the case of OFDM, the number of subchannels is high and they can each have the same width. The OFDM in particular appears to be suitable as a modulation method. OFDM is a technology that already has been proven in digital radio and in ADSL. OFDM is robust, in particular with respect to multipath propagation and various types of faults. The available spectrum B is divided into numerous narrow subchannels. The transmission of data takes place simultaneously on N carriers with the frequencies $f_1, f_2, \ldots f_N$. Each subchannel then has the bandwidth $$\Delta f = \frac{B}{N}.$$

Since the subchannels are narrow, there is constant damping and constant group transit time within each channel. Equalization is simple or usually not even necessary. This is a considerable advantage over broadband single-carrier methods.

The international standard IEC 62196 relates to plug-in connectors (plugs), plug-type sockets, bushings and cables with integrated fittings for electric vehicles, which cables are used for cable-bound charging systems. As is apparent, for example, from Wikipedia, they are specified for a range of
  690 V alternating voltage, with 50 to 60 Hz, given a rated current of up to 250 A; and
  600 V direct voltage, given a rated current of up to 400 A.
This standard specifies three classes of charging modes and associated types of cable:
Class 1: charging modes are provided for the domestic current up to 16 A. A CP (control pilot) contact is not provided here for permitting the charging process. Plugs and cables which are less than 16 A are not communicated by signaling but rather there is provision that the maximum current strengths are noted on a respective device itself.
Class 2: charging modes are provided for a device current up to 32 A, as can frequently be found both in single-phase and in three-phase configurations. In this mode a CP contact is used in the plug which acts as a switch in the socket. The use of industrial plugs according to IEC 60309 is provided here, but other industrial plugs with a specification of 32 A and more can also be used. Suitable class 1 charging plugs without signaling can also be used, but the charge current is then limited to 16 A.
Class 3: charging modes are provided for high-speed charging up to 250 A. Simple plugs with CP contact according to class 2 can be used, but they limit the charge current to 32 A. For relatively high charge currents, a suitable charging mode must be detected. The reference to the standard IEC 60309 adopts the physical parameters for a corresponding charging system up to 250 A, for example cable diameters and pin diameters in the plug. By means of pulse-width modulation, the maximum permissible charging current or the availability of digital communication is encoded. The latter forms the basis for controlled charging of electric vehicles to influence a charging process selectively.

A PLC chip is provided and uses a CP line that is present in an electrically driven motor vehicle, i.e. a vehicle-side CP line, to detect the state of a connection between the electrically driven motor vehicle and a corresponding charging station. For this purpose, the PLC enables the length of a CP line between the motor vehicle and the charging station to be measured. The length of the CP line between the motor vehicle and the charging station depends on the charging mode. Thus, a corresponding type of cable and the respective charging mode can be determined quickly.

The PLC chip transmits a signal into the CP line. The signal is reflected at the end of the CP line and returns to the PLC chip. Similar to an echo, the length of the CP line, and therefore the charging mode, are determined on the basis of the properties of the reflected signal, for example the damping of the signal or the transit time of the signal.

As a result, the charging mode can be detected automatically, which permits a rapid charging process.

Furthermore, a device for detecting a state of a connection between an electrically driven motor vehicle and a corresponding charging station is provided and uses the above-described method.

An electrically driven motor vehicle having a device according to the invention is provided for detecting a state of a connection between the electrically driven motor vehicle and a corresponding charging station.

Further advantages and refinements of the invention result from the description and the appended drawing. The features specified above and explained below can be used in the specified combination in other combinations or alone, without departing from the scope of the invention.

DETAILED DESCRIPTION OF THE PREFERRED EMBODIMENT

Figure 1:
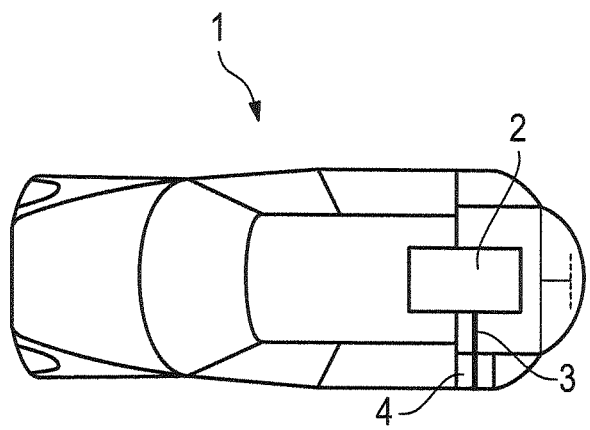
FIG. 1 is a schematic view of a first configuration of a cable connection in an electric vehicle in which there is no connection between the vehicle and the charging station.

FIG. 1 is a schematic view of a first configuration of a cable connection in an electric vehicle 1, in which there is no connection between a vehicle and a charging station. The cable connection of an electric vehicle 1 for charging at least one battery has means suitable for a flow of current and a PLC chip 2 for transmitting data between the electric vehicle 1 and a corresponding charging station. The PLC chip 2 uses for this purpose a CP line which, when the cable is not connected, extends from the PLC chip 2 to the socket 4 on the bodywork of the electric vehicle 1 only along a vehicle-side CP line 3. The PLC chip 2 transmits a signal along the CP line to detect whether a cable is connected to the vehicle 1. The signal is reflected at the end of the CP line and runs back to the PLC chip 2, which checks the signal. A signal transit time, i.e. the time between the transmission and reception of the signal, is measured to determine a corresponding length of the CP line, given a known signal speed. No cable is connected in FIG. 1. Thus, the CP line only extends along the vehicle-side CP line 3 from the PLC chip 2 as far as the socket 4 and is therefore relatively short. The length of the vehicle-side CP line 3 is known. As a result, an unambiguous determination is made in this example that no further cable is connected to the CP line. Additionally, a flow of current cannot be measured, and hence a determination is made that the motor vehicle is not connected to a charging station via a class 1 cable.

Figure 2:
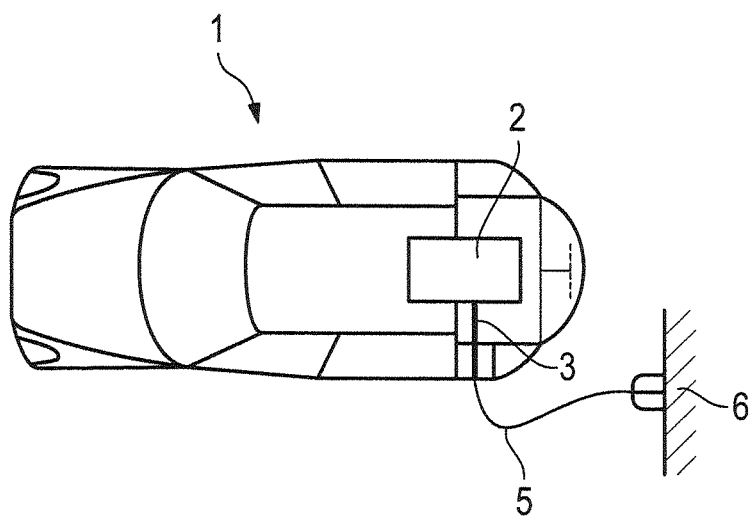
FIG. 2 is a schematic view of a second configuration of a cable connection in an electric vehicle in which a class 1 cable is connected.

FIG. 2 is a schematic view of a second configuration of a cable connection in an electric vehicle 1, in which a class 1 cable is connected. Class 1 cables are provided for the domestic current up to 16 A. A CP (control pilot) contact is not provided in Class 1 cables. Thus, in a way analogous to FIG. 1, the CP line also extends only from the PLC chip 2 to the socket 4 on the vehicle 1 along the vehicle-side CP line 3. However, in contrast to FIG. 1, the electric vehicle 1 is connected to a charging station 6 via a cable 5 and current flows through the cable 5. The PLC chip 2 detects, by the above-described method that a class 2 or 3 cable is not connected, but the flow of current indicates that a class 1 cable is connected to the vehicle.

Figure 3:
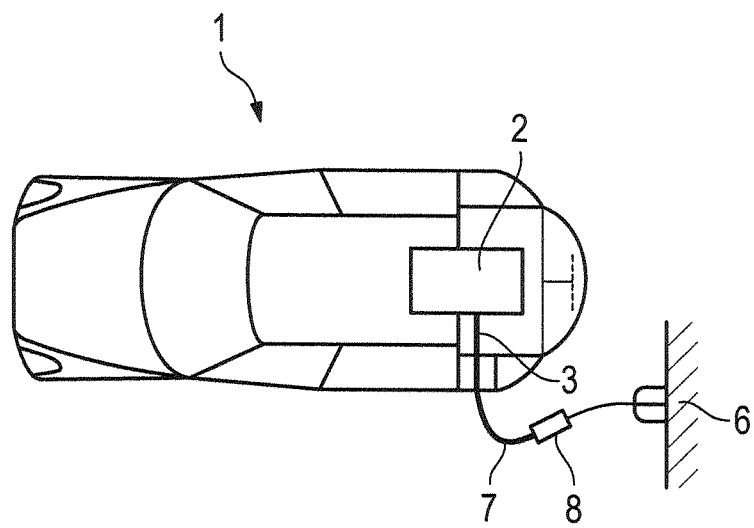
FIG. 3 is a schematic view of a third configuration of cable connection in an electric vehicle in which a class 2 cable is connected.

FIG. 3 is a schematic view of a third configuration of a cable connection in an electric vehicle 1, in which a class 2 cable is connected. Class 2 charging modes are provided for a device current up to 32 A, and frequently exist in single-phase and three-phase configurations. In this mode, a CP contact in the plug functions as a switch in the socket. Industrial plugs according to IEC 60309 may be provided, but other industrial plugs with a specification of 32 A and more also can be used. The CP line 7 in class 2 cables does not extend over the entire length of the respective cable but rather only from the vehicle-side end of the cable as far as an in-cable module 8 with an integrated CP communication module. If the PLC chip 2 transmits a signal, it is reflected at the module 8. In contrast to FIGS. 1 and 2, the entire CP line is composed of the vehicle-side CP line 3 and the cable-side CP line 7. Thus, the signal transit time will be longer than in the case of class 1 cables. The connection of a class 2 cable can be detected independently of the flow of current since the CP line runs separately from the power line. The presence of a flow of current can be determined separately, for example the CP communication module in the in-cable module 8 can send a corresponding signal to the PLC chip 2.

Figure 4:
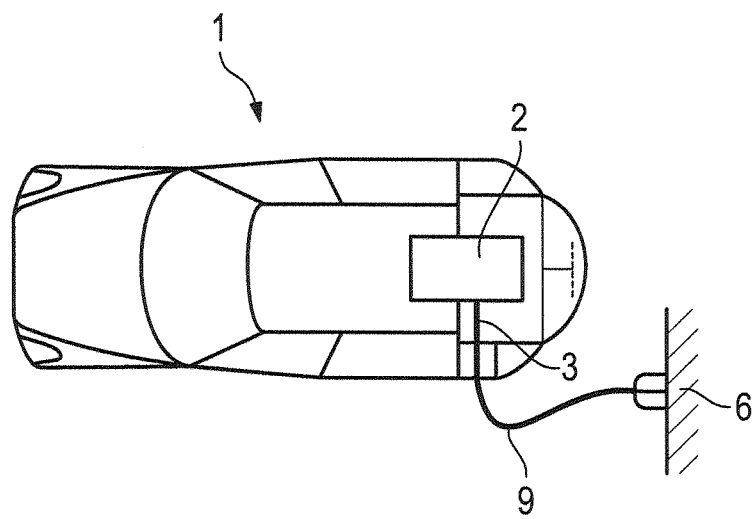
FIG. 4 is a schematic view of a fourth configuration of a cable connection in an electric vehicle in which a class 3 cable is connected.

FIG. 4 is a schematic view of a fourth configuration of a cable connection 1 in the case of an electric vehicle, in which a class 3 cable is connected. Class 3 charging modes are provided for high-speed charging up to 250 A. Simple plugs with class 2 CP modules can be used, but they limit the charging current to 32 A. For relatively high charging currents it is necessary to detect a suitable charging mode. The IEC 60309 plugs have the physical parameters for a corresponding charging system up to 250 A, for example cable diameters and pin diameters in the plug. By means of pulse-width modulation, the maximum permissible charging current or the availability of digital communication is encoded. The latter forms the basis for controlled charging of electric vehicles to influence the charging process selectively. In the case of class 3 cables there is provision that a CP line 9 extends between the electric vehicle and the charging station; the CP module is arranged here in the charging station (not shown). The PLC chip 2 transmits a signal along the CP line that is reflected at the level of the charging station 6. Thus, the CP line is composed of the vehicle-side CP line 3 and the cable-side CP line 9, which are in total longer than the total of the CP lines 3 and 7 of FIG. 3.

Cable lengths are not standardized. However, in the case of class 2 cables, a maximum distance between the socket 4 of the vehicle and the CP module in the in-cable module 8 of the class 2 cable that is plugged into the socket 4 is predefined and must not be exceeded. This maximum distance is shorter than the shortest permissible class 3 cable length, and the type of cable therefore can be determined unambiguously.

The described method enables the state of a connection between an electrically driven motor vehicle and a corresponding charging station to be determined quickly and reliably. The type of charging cable connected to a vehicle and whether current is flowing through the connected cable consequently is detected.

What is claimed is:

1. A method for detecting a state of a connection between a charging station and an electrically driven motor vehicle that has a power line communication chip and a vehicle-side control pilot line, the method comprising:

plugging a power line of the charging station into the motor vehicle to connect the vehicle-side control pilot line to a control pilot line of the charging station; using the power line communication chip of the motor vehicle to measure a length of the control pilot line between the motor vehicle and the charging station by transmitting a signal from the PLC chip along the CP line between the motor vehicle and the charging station and receiving the signal reflected at the end of the CP line between the motor vehicle and the charging station and run back to the PLC chip, wherein the length of the distance that the signal travels is determined based on the signal transit time; and determining a specific type of cable based on of the length of the CP line between the motor vehicle and the charging station.

2. The method of claim 1, in which the length of the CP line between the motor vehicle and the charging station is determined unambiguously from the distance travelled by the signal.

3. A device for detecting a state of a connection between an electrically driven motor vehicle and a corresponding charging station which has means which are configured to carry out the method of claim 1.

4. A method for detecting a state of a connection between a charging station and an electrically driven motor vehicle that has a power line communication chip and a vehicle-side control pilot line, the method comprising:

plugging a power line of the charging station into a socket of the motor vehicle;

sensing the presence or absence of current being delivered from the charging station to the motor vehicle;

using the power line communication chip of the motor vehicle to measure a length of the control pilot line from power line communication chip of the motor vehicle toward the charging station;

comparing the length of the control pilot line from power line communication chip of the motor vehicle toward the charging station to a known length of the control pilot line from power line communication chip of the motor vehicle to the socket; and identifying a class of cable at the charging station based on the length of the control pilot line from power line communication chip of the motor vehicle toward the charging station and the sensed presence or absence of current being delivered from the charging station to the motor vehicle.

5. The method of claim 4, wherein the step of using the power line communication chip of the motor vehicle to measure the length of the control pilot line between the motor vehicle and the charging station comprises measuring the length of the control pilot line between the motor vehicle and the charging station by at least a signal transit time.

6. An electrically driven motor vehicle, comprising:

a socket for accommodating a plugged connection with a power line of a charging station;

a power line communication chip, and a vehicle-side control pilot line extending from the power line communication chip to the socket, wherein the power line communication chip has:

a control pilot means for measuring a length of the control pilot line between the motor vehicle and the charging station;

a comparison means for comparing the length of the control pilot line from power line communication chip of the motor vehicle toward the charging station to a known length of the control pilot line from power line communication chip of the motor vehicle to the socket; and an identification means for identifying a class of cable at the charging station based on the length of the control pilot line from power line communication chip of the motor vehicle toward the charging station and the sensed presence or absence of current being delivered from the charging station to the motor vehicle.

\* \* \* \* \*